(12) United States Patent
Schneider et al.

(10) Patent No.: US 7,773,780 B2
(45) Date of Patent: Aug. 10, 2010

(54) AUGMENTED BIOMETRIC AUTHORIZATION SYSTEM AND METHOD

(75) Inventors: John K. Schneider, Snyder, NY (US); Fred Kiefer, Clarence, NY (US); Jack Kitchens, Tonawanda, NY (US)

(73) Assignee: Ultra-Scan Corporation, Amherst, NY (US)

( * ) Notice: Subject to any disclaimer, the term of this patent is extended or adjusted under 35 U.S.C. 154(b) by 618 days.

(21) Appl. No.: 11/737,009

(22) Filed: Apr. 18, 2007

(65) Prior Publication Data
US 2008/0025572 A1    Jan. 31, 2008

Related U.S. Application Data

(60) Provisional application No. 60/792,710, filed on Apr. 18, 2006.

(51) Int. Cl.
*G06K 9/00* (2006.01)
(52) U.S. Cl. ...................... 382/116; 340/5.82
(58) Field of Classification Search ............ 382/115, 382/116, 124; 340/5.82, 5.83; 713/186; 356/71
See application file for complete search history.

(56) References Cited

U.S. PATENT DOCUMENTS

| | | | |
|---|---|---|---|
| 4,821,118 A * | 4/1989 | Lafreniere | 348/156 |
| 6,256,737 B1 | 7/2001 | Bianco et al. | 713/186 |
| 6,446,210 B1 | 9/2002 | Borza | 713/201 |
| 2002/0025062 A1 * | 2/2002 | Black | 382/116 |
| 2003/0163710 A1 | 8/2003 | Ortiz et al. | 713/186 |
| 2003/0163739 A1 | 8/2003 | Armington et al. | 713/202 |
| 2005/0210270 A1 | 9/2005 | Rohatgi et al. | 713/186 |
| 2006/0078171 A1 * | 4/2006 | Govindaraju et al. | 382/115 |
| 2006/0171571 A1 * | 8/2006 | Chan et al. | 382/115 |
| 2006/0210119 A1 * | 9/2006 | Willis et al. | 382/115 |

OTHER PUBLICATIONS

International Search Report of ISA for PCT/US2007/066883, Publication Date Mar. 12, 2008, Ultra-Scan Corporation.
Written Opinion of ISA for PCT/US2007/066883, Publication Date Mar. 12, 2008, Ultra-Scan Corporation.
International Preliminary Report on Patentability for PCT/US2007/066883, Publication Date Oct. 19, 2009, Ultra-Scan Corporation.

* cited by examiner

*Primary Examiner*—Andrew W Johns
(74) *Attorney, Agent, or Firm*—Hodgson Russ LLP (57) ABSTRACT

Systems and methods of authorizing an activity, such as a financial transaction, are disclosed. Authorizing the activity may be accomplished by comparing a biometric sample to a biometric specimen. The sample is stored in a database and includes biometric information corresponding to two physiologically distinct portions of an individual. When that individual later is a person desiring to authorize an activity, he provides a specimen that includes biometric information corresponding to two physiologically distinct portions of his person. A comparison between the sample and the specimen is performed, and if a match is determined then the activity is authorized. If the comparison is performed and a match is not determined, then the activity is not authorized.

18 Claims, 6 Drawing Sheets

Definitions:

Receiver - Buyer, Patient, Service Recipient, etc. of goods or services provided by the Provider.

Provider - Seller, Service Provider, Clinic, Hospital, etc. providing goods or services to the Receiver.

Transaction - Sales agreement, electronic prescription, release of medical records, contract for paid services, custody transfer agreement, such as a trucking cargo manifest, or other items or actions or services entered into by the Receiver and Provider.

PIN - personal id number, phone #, name, zip code, city name, etc.

Binning - the selection of a subset of samples based on human physiology.

Filtering - the selection of a subset of samples based upon a non-physiological characteristic such as a PIN number (phone number, name, code number, etc.) that doesn't necessary have to be unique.

FIG. 3D

AUGMENTED BIOMETRIC AUTHORIZATION SYSTEM AND METHOD

CROSS-REFERENCE TO RELATED APPLICATION

This application claims the benefit of priority to U.S. provisional patent application Ser. No. 60/792,710, filed on Apr. 18, 2006.

FIELD OF THE INVENTION

The present invention relates to authorizing activities, such as (a) when a buyer authorizes debiting a financial account of the buyer in order to obtain a good or service from a seller, or (b) when someone is allowed to gain access to something, such as information or a secure location. These are only examples, and should not be interpreted to limit the invention to these activities.

BACKGROUND OF THE INVENTION

In an authorization procedure, there may be a need to identify a person as being authorized to engage in an activity. For example, the activity may be authorizing a financial transaction, gaining access to sensitive information, or entering secure location. Often, the authorization procedure is performed by comparing database information to information carried on an identification card, or another man-made token. If information on the token matches information in the database, the activity is authorized. For example, when a person desires to purchase groceries, he may present a credit card. If the credit card information matches to information in a database, the purchase is authorized. Such token-based authorization systems are problematic because the token may be stolen and used by an unauthorized person.

Some authorization systems require the user to remember one or more codes. For example, to gain access to a secure room, a person is often required to enter a combination before the door will unlock. Such a system is an example of a purely knowledge-based system since authorization is dependent only on the user's knowledge of the combination. Knowledge-based authorization systems are problematic in that many people have trouble remembering the authorization code. Further, the authorization code may be discovered by unauthorized persons, and later used to gain authorization.

Other types of systems combine features of a token-based system with features of a knowledge-based system. An example is a system that allows the purchase of goods using a debit card. Use of the debit card to authorize the purchase of goods may require the user to provide a man-made token in the form of a plastic card, and may also require the user to provide an identification number before the user is authorized to use the corresponding debit account to purchase goods. Such systems may be more secure than purely token-based systems or purely knowledge-based systems, but they are still highly susceptible to use by unauthorized persons, and may require the authorized user to have a good memory.

The physiological and/or behavioral characteristics of an individual are often referred to as "biometrics", and biometrics may be used to identify a person as being someone authorized to engage in an activity. Authorization systems have employed biometrics along with tokens as a means for preventing the unauthorized use of tokens.

Recently, authorization systems have been provided which do not require any token, and instead rely entirely on a biometric. The biometric used by such authorization systems typically is a fingerprint, but some systems use a scanned image of the person's iris, hand geometry, or a palm print. Other types of biometrics may be used. Purely biometric-based systems are not fool proof. For example, a rubber duplicate of an authorized user's fingerprint may be made and used by an unauthorized person to gain authorization for an activity. Or, biometric based systems may erroneously believe an unauthorized person's fingerprint to be similar enough to an authorized user's fingerprint such that authorization is erroneously determined.

Therefore, some existing biometric-based systems require the user to provide an identification code (along with the biometric) in order for the user to be authorized to engage in the activity. Such systems combine features of biometric-based systems with features of knowledge-based systems, and as such, those systems have the problems associated with knowledge-based systems, even though they may provide a higher level of security.

The existing authorization systems require the user to posses a token or remember a code and/or provide an insufficient level of security for society's current needs. A more secure system of authorizing an activity is needed.

SUMMARY OF THE INVENTION

The invention may be embodied as a biometric authorization system having a biometric input device, a database of biometric information, a computer and a communication network. The communication network may be capable of allowing communication between the biometric input device and the computer, and allowing communication between the database of biometric information and the computer.

The biometric input device may be capable of receiving a biometric specimen from a person and/or creating a biometric specimen derived from the biometrics provided by the person. The specimen may have information corresponding to two physiologically distinct portions of the person. The database of biometric information may have biometric samples stored therein, each sample comprising information corresponding to two physiologically distinct portions of an individual. The two physiologically distinct portions of the individual that are used to create the information of the sample, and the two physiologically distinct portions of the person that are used to create the specimen may perform a similar function or different functions.

With regard to the sample, a correlating factor may be included in the information about the two physiologically distinct portions of an individual. The correlating factor may be derived from a relationship between a biometric feature corresponding to a first one of the physiologically distinct portions and a biometric feature corresponding to a second one of the physiologically distinct portions. A similar correlating factor may be created with respect to the specimen, and then the correlating factors may be compared as part of an effort to determine whether a match exists between the sample and the specimen.

With regard to the sample, a probability distribution function or receiver operating curve may be included in the information about the two physiologically distinct portions of an individual. As part of an effort to authorize the activity, a value may be created using the biometrics provided by the person during an attempt to authorize an activity. The value may be created so that it can be compared to the probability distribution function, or the receiver operating curve, as the case may be. The value may be compared to the probability distribution function or the receiver operating curve, as the case may be as part of an effort to determine whether a match exists between the sample and the specimen.

The computer may have software capable of comparing the biometric specimen to biometric samples, and capable of sending an authorization signal indicating whether a match exists between the specimen and one of the samples. If the signal indicates a match, the activity may be authorized, but if the signal indicates that no match exists, then the activity may not be authorized.

The system may include an index-information receiving device that is in communication with the computer and capable of receiving index-information from the person from whom the specimen was derived. The index-information may be obtained at about the time when the person provides the biometrics for the specimen. The index-information may include a number, a series of letters or a combination of numbers and letters. Alternatively, or in addition, the index-information may include a type of specimen provided to the system. The index-information from the person may be used to locate matching index-information that is correlated with a sample in the database, and in this manner, a sample that is likely to result in a match can be efficiently identified.

The invention may be embodied as a method of authorizing an activity. For example, such a method may include the following steps: (a) enrolling an individual and creating a biometric sample having information corresponding to two (or more) physiologically distinct portions of the individual, (b) storing the biometric sample in a database, (c) obtaining a biometric specimen related to a person, the specimen having information corresponding to two (or more) physiologically distinct portions of the person, (d) comparing the specimen to the sample, (e) determining whether the specimen and the sample match, (f) providing an indication whether the specimen and the sample match and (g) authorizing the activity if the indication is that a match exists between the specimen and the sample.

The process of enrolling an individual may also include identifying a financial account of that individual so that when an activity is authorized, the financial account may be used to pay for goods or services later sought by the individual. The financial account may be correlated with the biometric sample in the database.

Similarly, the process of enrolling an individual may also include identifying index-information. The index-information may be correlated with the biometric sample, and used to more efficiently identify samples in the database that should be compared to a specimen. The index-information may be a series of letters, numbers or a combination thereof. The index information may be a type of biometric sample, for example whether the biometric sample, or a part thereof, was derived from a left hand or a right hand. When an activity is desired to be authorized, the person related to the biometric specimen may also provide index-information, and the index-information may be used to identify those samples in the database that are most likely to yield a match with the biometric specimen. A comparison may be then carried out until one of the samples identified by the index-information results in a match with the specimen, or until all the identified samples have failed to match the specimen.

Comparing the specimen to samples may be carried out in a particular order. For example, when the individual is enrolled, a first portion of the sample, which corresponds to a first one of the physiologically distinct portions from which the sample was derived, may be identified and later compared to a first part of the specimen. If a match is determined between the first portion of the sample and the first part of the specimen, then a second portion of the sample, which corresponds to a second one of the physiologically distinct portions from which the sample was derived, may be compared to a second part of the specimen. However, if it is determined that a match does not exist between the first portion of the sample and the first part of the specimen, then it may be decided to indicate (e.g. send a signal) that the sample does not match the specimen, before a comparison of the second portion of the sample is made with the second portion of the specimen, thereby saving time. If the second portion of the sample and the second part of the specimen are compared and determined to match, then it may be decided to indicate (e.g. send a signal) that the sample and specimen match.

The information about two physiologically distinct portions of an individual in the sample may include a probability distribution function or receiver operating curve derived from features of the biometrics taken during enrollment. When a specimen is created from the biometrics provided by the person, a value may be created that can be compared to the function or the curve (as the case may be) during the comparison step, and a determination may be made as to whether the value falls relative to the function or curve to indicate that a match is likely. If a match is determined to be likely, then an indication may be provided that a match exists, but if a match is determined to be not likely, then an indication may be provided that a match does not exist.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Reliable personal authentication is becoming increasingly important. For example, many financial and non-financial transactions that once relied on man-made tokens or other identifying instruments to verify the identity of a person are increasingly being targeted by people engaging in identity theft. Identify theft may result in an unauthorized person being allowed to make a purchase, contract for a service, or obtain sensitive information such as medical records.

Traditional security measures rely on knowledge-based approaches such as by using a password and PIN (Personal Identification Number), or on token-based approaches such as swipe cards or photo identification to establish the identity of a person. Combinations of these traditional systems exist in the prior art. Despite being widely used, these are not very secure forms of identification. As an illustration of the degree to which these forms of identification fall short, one need only consider the estimated hundreds of millions of dollars that are lost annually in credit card fraud in the United States due to consumer misidentification and identity theft.

Biometrics offers a more reliable alternative. Despite advances in biometric fingerprint identification systems, several obstacles have hindered their deployment. For example, accuracy rates are not yet high enough to make many transaction authorization systems profitable. For example, assume that systems relying on one fingerprint to authorize a transaction have an accuracy rate that is at best about one error in 10,000—that is to say, that for every 10,000 attempts to match a fingerprint, there is one error. If the error is a fraudulent attempt, and the revenue derived from a one-finger biometric authentication event is $0.03, this translates to 9,999 successful authentications bringing in a revenue of only $300. A single transaction authorized by a biometric may exceed $300. For example, if the transaction that is erroneously approved is for $500, then for every 10,000 transactions with one such failure there will yield a net loss of $200. On the other hand, if the error occurs during a non-fraudulent attempt, the result of the error may be crediting or debiting an account that is not supposed to be credited/debited, and correcting that error may cost more than several hundred dollars and negatively impact the faith people have in the system, thereby impeding the system's acceptance and implementation.

A more accurate identification system is needed. We have developed a biometric system which utilizes two biometrics taken from an individual. The invention is not limited to the use of two biometrics, and it must be recognized that the invention may be implemented using two or more biometrics. For example, in such a system, the biometrics may be obtained from the fingers of the same person. Our two finger biometric authorization system has a false error rate that is about 1:1,000,000. Using the same financial attributes as noted above, 1 million transactions would bring in revenue (at $0.03 per transaction) of $30,000, and the one failure in those million transactions would still be $500, but the net would be a gain ($29,500) rather than a loss.

Further, the use of a two-biometric system in lieu of a one-biometric system may speed transactions and improve the reliability of the transaction based system resulting in a system that is useful, reliable and suitable for commercial operations.

The invention described herein may be implemented as a method or a system. Initially, an individual will be enrolled to the system. As part of the enrollment process, the individual may be required to provide two biometrics, each from a physiologically distinct part of the individual's body. Later, when that individual becomes a "receiver", a biometric sample, related to the two biometrics provided during enrollment, will be used to determine whether the receiver is authorized to engage in a desired activity.

For purposes of this disclosure the "receiver" is defined as the person that is required to provide biometric specimens in order to have an activity authorized. The receiver usually desires to receive goods or services, but the receiver may provide goods or services. By way of contrast, the "provider" is defined as the entity that is not required to provide biometric information, although it is not precluded from doing so, in order to have an activity authorized. Usually, the provider provides goods or services, but the provider may receive goods or services.

To assist with describing the invention, the term "sample" and "biometric sample" are used to identify information derived from biometrics obtained during enrollment. The term "specimen" and "biometric specimen" are used to identify information derived from biometrics obtained as part of an effort to authorize an activity.

The activity desired by a receiver may be a transaction related to a contract, prescription for drugs, release of medical records, custody transfer agreement, or other activity where it is desirable to determine whether the receiver is authorized to engage in the activity. The use of biometric information derived from the receiver and used according to the invention may allow the receiver to dispense with carrying a man-made token in order to authorize a receiver-provider activity.

To enroll an individual with the system, the individual identifies himself and provides at least two biometrics, which are then used to create a biometric sample. Also, information about the individual's financial institution may be obtained, for example, a bank account number from which funds may be withdrawn in order to complete a later transaction, such as an electronic financial transaction, custody transfer, information release or other activity.

The biometric sample may be stored electronically in a database of biometric information ("DBI") for later use in authorizing an activity. The DBI may also include information identifying a financial account of the receiver, so that when an activity is authorized, money can be efficiently moved to or from the identified financial account. The financial account may be a debit account, credit account, line of credit or other similar financial account.

The biometric sample may correspond to biometric information taken from two physiologically distinct portions of the individual being enrolled. The biometric information taken during enrollment from the first portion of the individual is referred to herein as the "first portion BI". The biometric information taken during enrollment from the second portion of the individual is referred to herein as the "second portion BI".

Similarly, the term "first part BI" is used to refer to biometric information corresponding to the first physiologically distinct portion of the person desiring to authorize an activity. And the term "second part BI" is used to refer to biometric information corresponding to the second physiologically distinct portion of the person desiring to authorize an activity.

The biometric sample may be comprised of information in the form of an electronic representation of the physiological portions of the individual that enrolled, such as an electronic representation of fingerprints of two different fingers, or the iris scan from both eyes of the individual that enrolled. However, the biometric sample may be derived from portions having different functions, such as a fingerprint and an iris scan from the individual that enrolled. The biometric sample may be derived from biometrics that were taken at about the same time, or the biometric sample may be derived from biometrics that were taken at different times and/or in a prescribed order.

Figure 1:
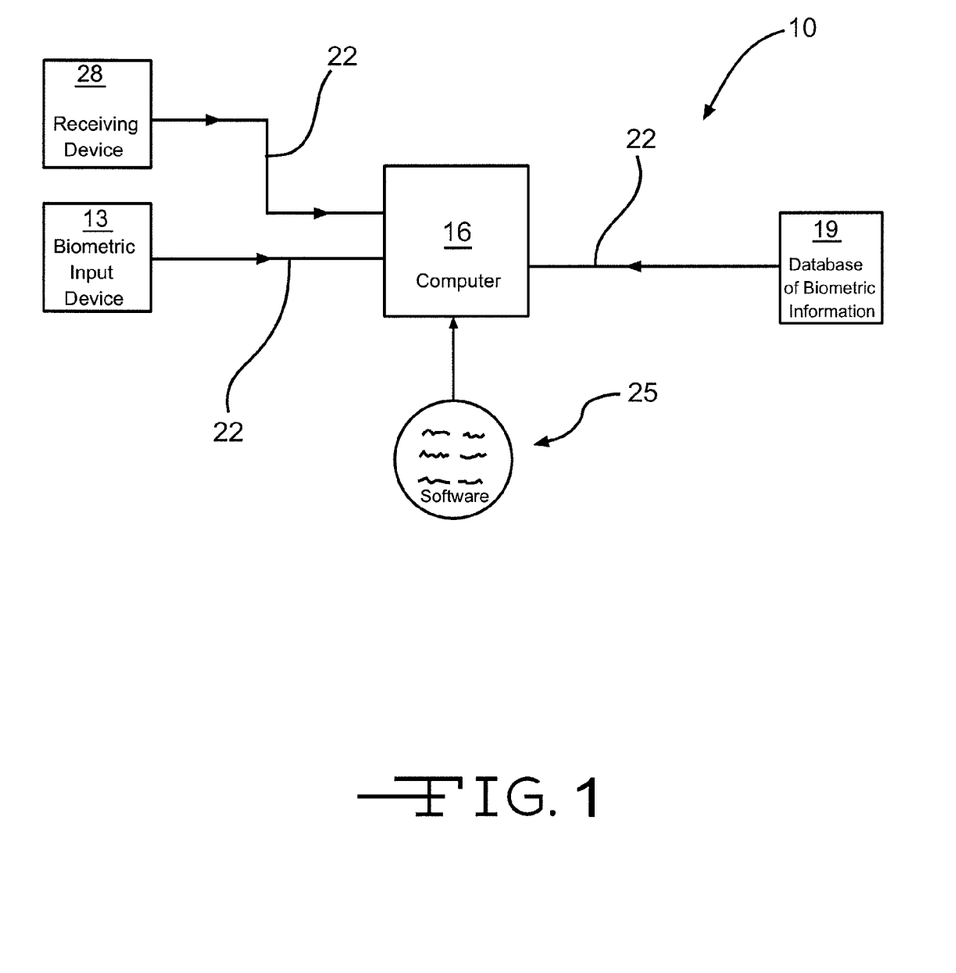
FIG. 1 is a schematic depicting a system according to the invention.

With reference to FIG. 1, once the receiver is enrolled, a system 10 according to the invention may be used to authorize an activity, such as a financial transaction. A biometric input device ("BID") 13 may be used to receive biometrics used to create a biometric specimen. A similar device (or the same device) may be used to acquire the biometrics for the sample during enrollment. For example, the BID 13 may be an ultrasonic fingerprint scanner, an iris scanner or a hand geometry scanner. The specimen may be sent in electronic form to a computer 16 that is in communication with the DBI 19, where the biometric samples are stored. Communication between the BID 13 and the computer 16, and between the computer 16 and the DBI 19 may be provided by a communications network 22 such as the Internet. The computer 16 may have software 25 running on it that is able to cause the computer 16 to search the DBI 19 and compare biometric specimens derived from using the BID 13 to biometric samples stored in the DBI 19. The BID 13 may have the ability (for example via a microprocessor and software) to create the biometric specimen, or the computer 16 may have software which is able to create the biometric specimen.

To search the DBI 19 faster, index-information may be provided when the individual enrolls. The index-information may be a PIN, physiological feature, phone number, name, zip code, residence city or the name of the individual. Or the index-information may be an indication of the type of biometric provided, for example whether the biometric sample was taken from the left hand, the right hand, or some relationship between the first portion BI and the second portion BI, such as the relative size of the physiologically distinct portions. When the index-information is provided by the individual during enrollment, the index-information may be correlated with the biometric sample in the DBI 19 for later use in authorizing an activity.

When the index-information is a string of letters or numbers, or some combination of letters and numbers, a system according to the invention may be equipped with a receiving device 28. For example, the receiving device 28 may have a numeric keypad, which can be used by the receiver to enter his PIN, phone number or zip code (for example). Or the receiving device 28 may have an alphabetic keypad, which can be used by the receiver to enter a series of letters. The information entered by the receiver as part of an effort to authorize an activity, may be used to find matching index-information in the DBI 19 in order to identify samples that are likely to yield a match with a specimen provided by the receiver.

Further details of such a system 10 are provided below in conjunction with the description of a method according to the invention.

Figure 2:
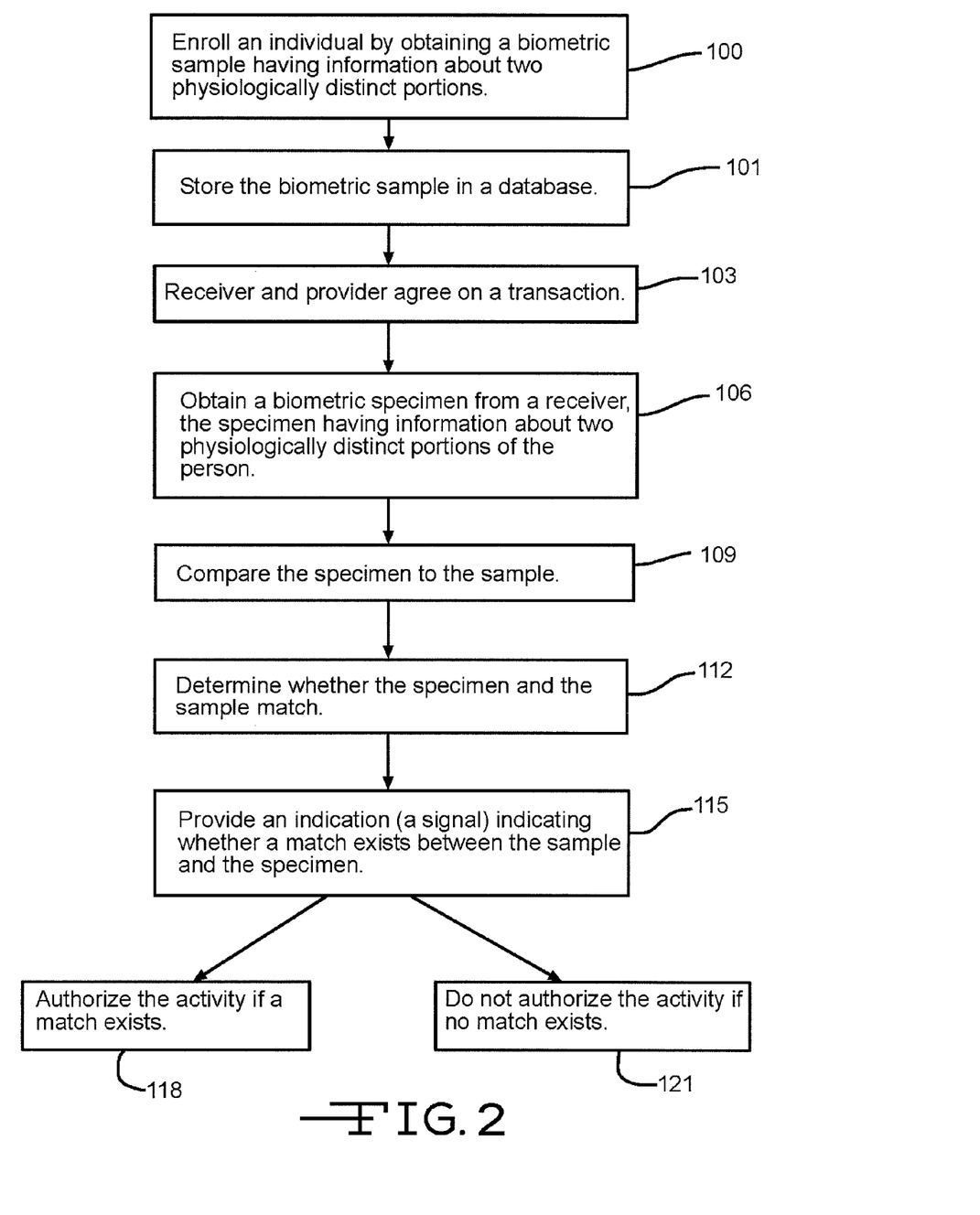
FIG. 2 is a flow chart depicting general features of a method according to the invention.
Figure 3A:
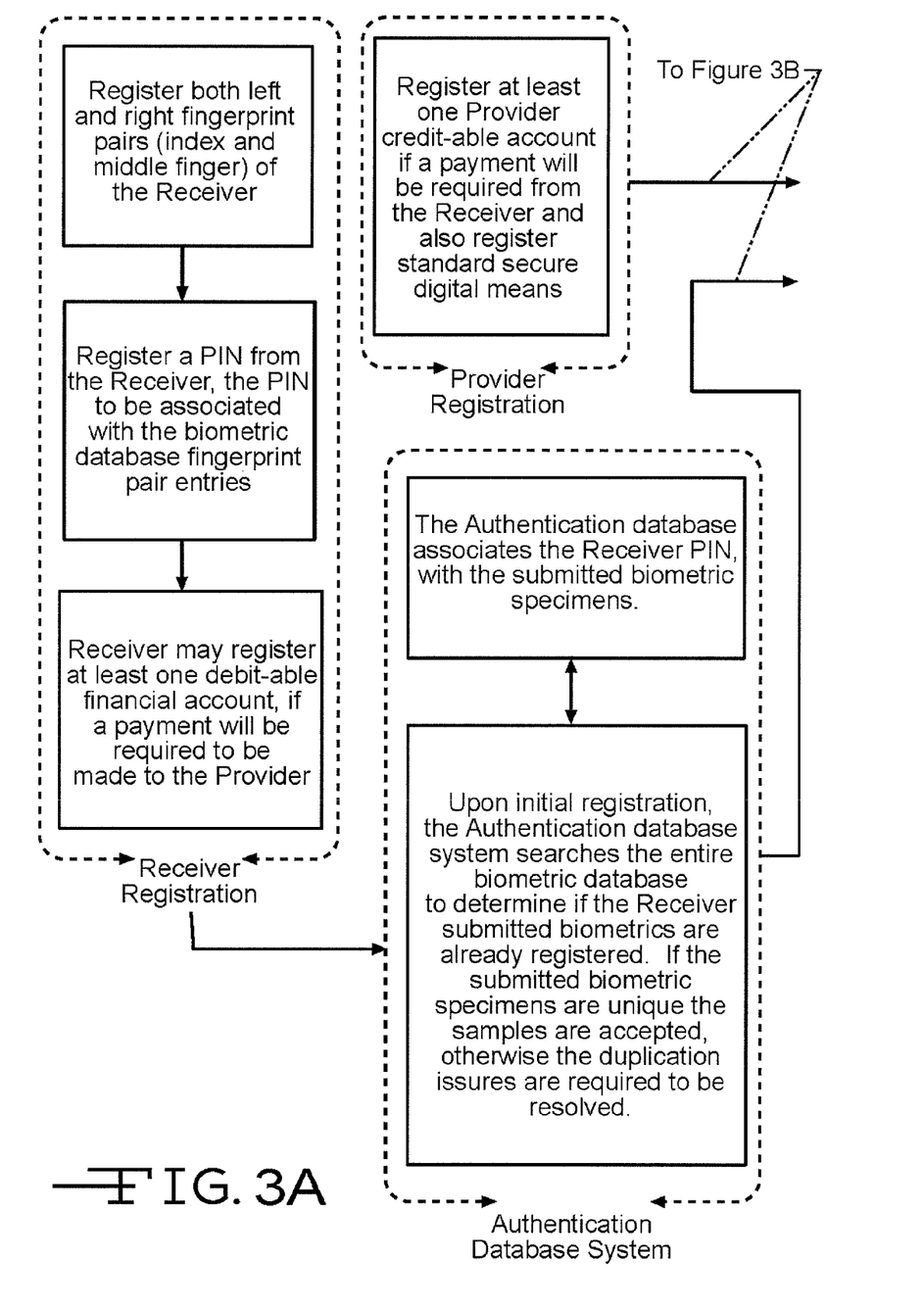
FIGS. 3A through 3D are a flow chart depicting more details of a method that is in keeping with that depicted in FIG. 2.
Figure 3B:
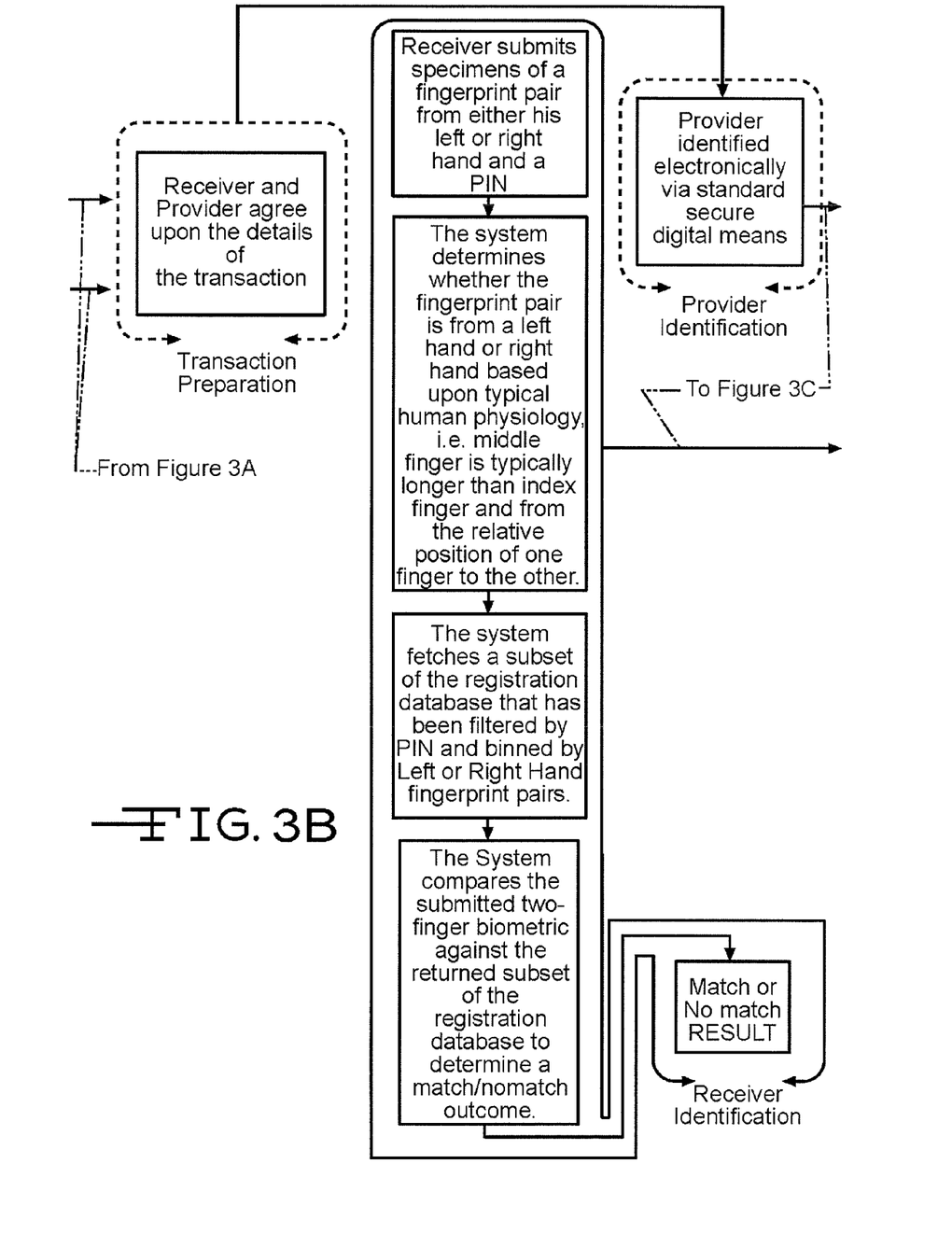
Figure 3C:
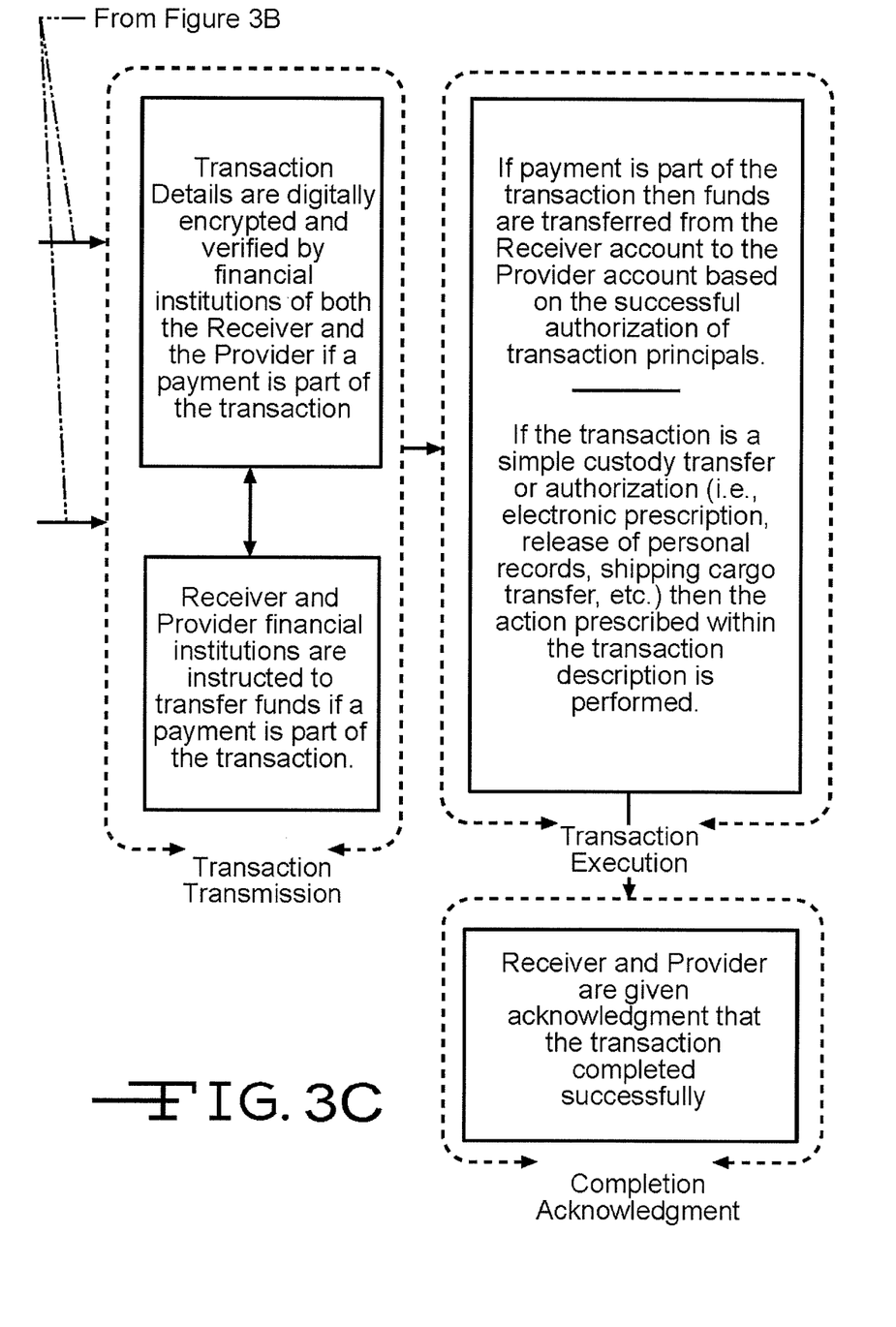
Figure 3D:
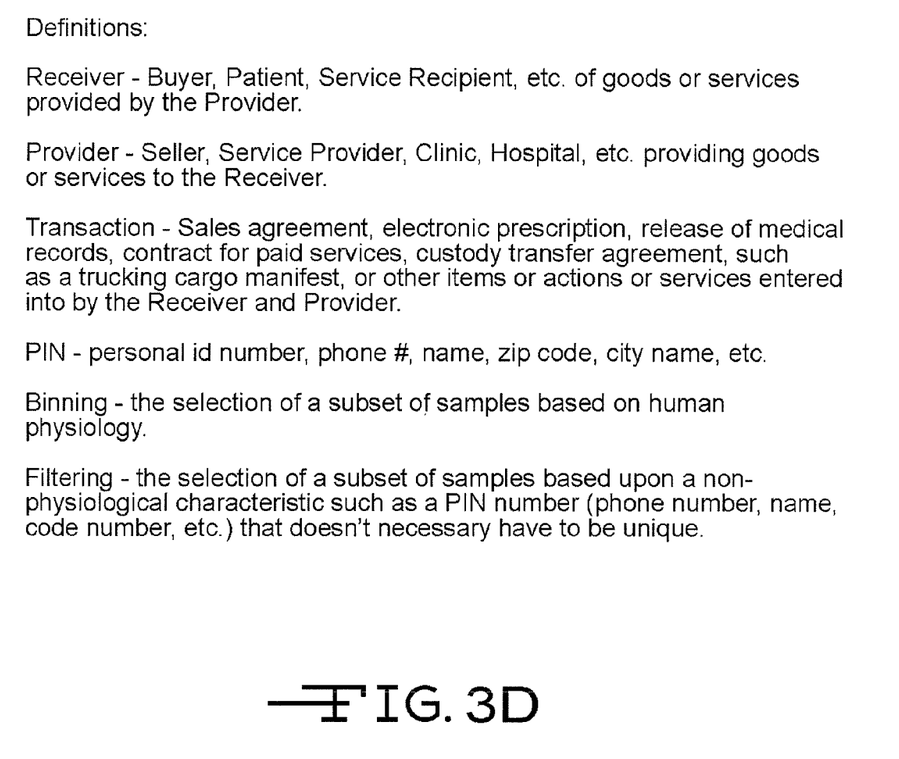

With reference to FIG. 2, a method according to the invention may include enrolling 100 the individual with the authentication system 10. In the enrollment process, the individual may use a computer and appropriate scanners to provide biometric information, which may be used to create a biometric sample. The enrollment process 100 may also include providing index-information and providing information about a financial account owned by the receiver. The index-information and financial account information may be correlated with the biometric sample in order to enable efficient retrieval of the sample and financial account information.

Another individual or the provider may also enroll with the system and provide at least one financial account. In this manner, the provider's financial account may be enabled to receive funds from the receiver's financial account when a transaction is authorized.

A method according to the invention may include a transaction step 103, during which the receiver and provider agree on the details of a proposed transaction, such as a price, product, service, custody transfer, or contract. Then the receiver may provide 106 biometrics from two physiologically distinct portions of the receiver's body, and a biometric specimen may be derived from those biometrics. For example, the receiver may allow two of his fingers to be analyzed by an ultrasonic scanner in order to provide an electronic representation of two of the receiver's fingers, and the electronic representation may be used to create the biometric specimen. The receiver may also provide index-information via the index-information receiving device 28.

The computer 16 may be used to compare 109 the biometric specimen to biometric samples, which were stored 101 in the DBI 19, to determine 112 whether any of the biometric samples in the DBI 19 match the biometric specimen. In one embodiment of the invention, the comparison 109 may be made between the biometric samples and the biometric specimen by comparing 109 a first part of the specimen to the first portion BI of the biometric samples in the DBI 19 that are believed to match. If a match between the first portion BI of a particular sample and the first part BI of the specimen is found, then the second portion BI of the sample may be compared 109 to a second part BI of the specimen. In this manner, the order in which the portions are provided may be used to provide an additional level of security when authorizing a transaction.

If the portions of the sample are determined 112 to match the parts of the specimen, then the computer 16 may provide 115 a signal indicating that a match has been found and that the activity is authorized 118. If a match is not found, then the computer 16 may provide 115 a different signal indicating that a match was not found and that the activity is not authorized 121.

Of course there are other ways of carrying out the comparison 109. In another embodiment of the invention, a detail corresponding to the first portion BI may be identified, and a detail corresponding to the second portion BI may be identified, and then a correlating factor, such as the distance between the identified details, may be determined. The correlating factor may be derived by determining a relationship (such as a distance) between a biometric detail corresponding to a first one of the physiologically distinct portions, and a biometric detail corresponding to a second one of the physiologically distinct portions. The correlating factor may be stored as part of the biometric sample and later compared to a similarly determined correlating factor corresponding to the biometric specimen. If the correlating factor corresponding to the sample is statistically similar to the correlating factor corresponding to the specimen, then the sample and specimen may be determined 112 to match.

For example, if the first portion BI includes two features and the midpoint between those two features is identified as a detail corresponding to the first portion BI, and the midpoint of two features on the second portion BI is identified as a detail corresponding to the second portion BI, then the correlating factor may be the distance between the two identified midpoints. We have found that when the correlating factor is a distance from a location in the first portion BI to a location in the second portion BI, and a similar distance is determined for the specimen, then the comparison 109 and determination 112 steps may be carried out with a very low error rate. While it may be possible for an imposter to provide a specimen in which the first part BI and the second part BI are similar to the first portion BI and the second portion BI (e.g. through the use of rubber covers each having a desired fingerprint for covering an imposter's fingers), it is much harder for that imposter to duplicate the correlating factor (e.g. because the rubber covers are not properly positioned relative to each other due to differences in the imposter's hand geometry). As such, the comparison 109 may be carried out using the correlating factor by itself, or in conjunction with the first/second portion BIs as part of a method according to the invention.

The index-information may be used to reduce the number of samples that are compared to the specimen before a match is found. For example, the DBI 19 may be searched first for matching index-information, and then when a match of the index-information is found, the corresponding biometric sample may be compared 109 to the biometric specimen. In this manner, fewer samples may be compared 109 to the specimen before a match is determined 112.

Alternatively, or in addition, the authorizing system may characterize the specimen and then make the comparison 109 only on those samples that have a similar characterization. For example, the authorizing system 10 may determine that the first part BI of the biometric specimen is from the left hand, and then compare 109 the specimen only to biometric samples that have been characterized as having a first portion BI from the left hand. In this manner, fewer comparisons may be needed before a match is found.

The invention may include a step in which a determination is made regarding the type of biometric specimen provided by the receiver. For example, the receiver may identify or the computer 16 may automatically determine whether the biometric specimen is from the left hand or the right hand, and then the samples in the DBI 19, which are from that type of hand, may be compared to the specimen. As another example, the relative size of the biometric portions, for example the relative lengths of the fingers provided to create the biometric specimen, may be determined and then only samples from the DBI 19 having a first portion BI and a second portion BI with a similar size relation may be compared to the specimen. This too can reduce the number of comparisons needed before a match is determined.

The process of determining 112 whether a match exists between a sample and a specimen can be carried out in many different ways. One such way is to determine a score for each of the comparisons that are made in comparing 109 the sample to the specimen. A score may indicate the degree to which the particular comparison indicates a match. For example, if the comparison 109 made between the first portion BI of the sample and the first part BI of the specimen shows a high degree of similarity, then a first assigned score may be high. Similarly, if the comparison 109 made between the second portion BI and the second part BI of the specimen shows a high degree of similarity, then the a second assigned score may be high. By mathematically combining the scores, such as by adding the scores, the resulting score may be compared to a threshold value. If the combined score is at or above the threshold value, then a match may be determined 112 to exist between the sample and the specimen.

In another embodiment of the invention, a detail corresponding to the first portion BI may be identified, and a detail corresponding to the second portion BI may be identified, and then a correlating factor, such as the distance between the identified details, may be determined. The determined distance may be stored as part of the biometric sample and later compared to a similarly determined correlating factor corresponding to the biometric specimen. If the correlating factor corresponding to the sample is statistically similar to the correlating factor corresponding to the specimen, then the sample and specimen may be determined 112 to match.

It is also possible to use a third assigned score, which is determined with regard to correlating factors of the sample and specimen. Then in determining 112 whether a match exists, the first and second assigned scores may be used in conjunction with the third assigned score. For example, the scores may be mathematically combined, for example by adding the scores, together to provide a total score, which is then compared to a threshold value, and if the total score is at or above the threshold value, then a match may be determined 112 to exist, but if the total score is below the threshold value, then a match may be determined 112 not to exist.

In lieu of simply adding the scores, the scores may be weighted according to their perceived ability to predict a match, and the weighted scores may be mathematically combined to arrive at the total score.

More sophisticated means may be used to make the comparison 109 and determination 112. In one such implementation of the invention, a probability distribution function ("pdf") or a receiver operating curve ("roc") is created. The pdf or roc may correspond to details of the biometrics provided by the individual during enrollment, and this pdf or roc may be included in the sample stored in the DBI 19. The pdf or the roc may describe the statistical likelihood of finding certain features in the biometrics provided during enrollment of the individual. Using the biometrics provided by the receiver as part of an effort to authorize an activity, a value (the "specimen value") may be determined which is then compared 109 to the pdf or roc. Depending on where the specimen value falls relative to the pdf or the roc will enable the computer 16 to determine 112 whether a match is likely or not. If the specimen value falls relative to the pdf or the roc such that a match is statistically likely, then it may be determined 112 that a match exists, and an indication may be sent 115 which indicates a match between the sample and the specimen. However, if the specimen value falls relative to the pdf or the roc such that a match is not likely, then it may be determined 112 that a match does not exist, and a corresponding indication may be sent 115 which indicates a match between the sample and the specimen does not exist.

In order to accommodate efficient use of more sophisticated comparison techniques, a method according to the invention may dispense with saving electronic versions of the scanned biometrics. For example, instead of storing the biometrics obtained during enrollment, the sample stored in the DBI 19 might be the pdf or roc (as the case may be). Then the biometrics provided as part of an effort to authorize an activity may be used to create the specimen value, which would then quickly be compared 109 to the pdf or roc.

If a match is determined 112 between a biometric sample in the DBI 19 and the biometric specimen, then the transaction may be authorized 118 to proceed. When a match is indicated, the computer 16 may be instructed to determine whether the receiver has sufficient resources in his financial account to carry out the transaction. The computer 16 may prepare the transaction details and protect those details using encryption technologies such as PKI. The results of the biometric authorization may be included in the transaction details. The provider may be identified in the transaction details. If the transaction is financial, the transaction details may include the receiver's financial account information and the provider's financial account information.

With reference to FIGS. 3A-3D, if the financial account of the receiver has sufficient funds to accommodate the transaction, the receiver's financial account may be debited and the financial account of the provider may be credited in a payment step. Details about the transaction may be transmitted to the financial institutions involved. This step may be carried out by a third party, which amasses information on many such transactions and presents the financial institutions with a summary statement on a periodic basis. In this manner, the burden on the financial institutions of processing a large number of transactions may be reduced.

If authorized, the activity may be executed. For example, if the activity is a financial transaction, the financial institutions may execute a transfer of funds from a receiver's account to the provider's account. An acknowledgment may be returned to the receiver and to the provider to indicate that the transaction has either been carried through successfully or has failed. In the case of a failure, the receiver and provider may be required to remedy the failure through other arbitration means, that may or may not be conducted electronically.

U.S. provisional patent application No. 60/792,710 discloses additional details about the invention and additional embodiments of the invention. The disclosure of that patent application is incorporated by this reference.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A biometric authorization system, comprising:
   a biometric input device, capable of receiving biometric information from a person, the biometric information from the person having information about two physiologically distinct portions of the person;
   a database having biometric samples stored therein, each sample comprising information corresponding to two physiologically distinct portions of an individual and a correlating factor, which is derived from a relationship between a detail of the biometric corresponding to a first one of the physiologically distinct portions of the individual and a detail of the biometric corresponding to a second one of the physiologically distinct portions of the individual;
   one or more computers having software capable of creating a biometric specimen from the biometric information from the person, the specimen including a correlating factor, which is derived from a relationship between a detail of the biometric corresponding to a first one of the physiologically distinct portions of the person and a detail of the biometric corresponding to a second one of the physiologically distinct portions of the person, and comparing the biometric specimen to the biometric samples, and capable of sending an authorization signal indicating whether a match exists between the specimen and one of the samples; and
   a communication network capable of allowing communication between the biometric input device and the computer, and allowing communication between the database of biometric information and the computer.

2. The biometric authorization system of claim 1, further comprising an index-information receiving device, in communication with one of the computers and capable of receiving index-information from the person.

3. The biometric authorization system of claim 2, wherein the database correlates samples with index-information.

4. The biometric authorization system of claim 1, wherein the information corresponding to two physiologically distinct portions of the individual includes a probability distribution function.

5. The biometric authorization system of claim 1, wherein the information corresponding to two physiologically distinct portions of the individual includes a receiver operating curve.

6. A method of authorizing an activity, comprising:
   enrolling an individual by obtaining a biometric sample, the sample having information corresponding to biometrics of two physiologically distinct portions of the individual, and a correlating factor derived from a relationship between a detail of the biometric corresponding to a first one of the physiologically distinct portions of the individual and a detail of the biometric corresponding to a second one of the physiologically distinct portions of the individual;
   storing the biometric sample in a database;
   obtaining a biometric specimen from a person, the specimen having information corresponding to biometrics of two physiologically distinct portions of the person, and a correlating factor derived from a relationship between a detail of the biometric corresponding to a first one of the physiologically distinct portions of the person and a detail of the biometric corresponding to a second one of the physiologically distinct portions of the person;
   comparing the specimen to the sample; and
   determining whether the specimen and the sample match;
   providing an indication whether the specimen and the sample match;
   authorizing the activity if the indication is that a match exists between the specimen and the sample.

7. The method of claim 6, wherein the two physiologically distinct portions of the individual perform a similar function.

8. The method of claim 6, wherein the two physiologically distinct portions of the individual perform different functions.

9. The method of claim 6, wherein:
   enrolling the individual further includes identifying a financial account; and
   correlating the financial account with the biometric sample.

10. The method of claim 6, wherein:
    enrolling the individual further includes identifying index-information; and
    correlating the index-information with the biometric sample.

11. The method of claim 10, wherein the index-information includes a number.

12. The method of claim 10, wherein the index-information includes a series of letters.

13. The method of claim 10, wherein the index-information is a type of the biometric sample.

14. The method of claim 10, wherein comparing the specimen to the sample includes:
    accepting index-information at about the time when the biometric specimen is obtained;
    searching the database for matching index-information;
    identifying samples that are correlated to the matching index-information; and
    wherein the step of comparing the specimen to the sample is carried out on those samples that are correlated to the matching index-information until a match is determined.

15. The method of claim 6, wherein:
    comparing the specimen to the sample is carried out by comparing a first portion of the biometric sample to a first part of the specimen, and if a match is determined, then comparing a second portion of the biometric sample to a second part of the specimen; and
    the indication of a match is provided if the first portion matches the first part, and the second portion matches the second part.

16. The method of claim 6, wherein comparing the specimen to the sample is carried out by:
    comparing a first portion of the biometric sample to a first part of the specimen;
    providing an indication that a match does not exist if a match between the first portion of the biometric sample and the first part of the specimen is not determined;
    if a match between the first portion of the sample and the first part of the specimen is determined, then comparing a second portion of the biometric sample to a second part of the specimen;
    providing an indication that a match does not exist if a match between the second portion of the sample and the second part of the specimen is not determined; and
    providing an indication that a match exists if a match between the second portion of the sample and the second part of the specimen is determined.

17. The method of claim 6, wherein:
    the information corresponding to two physiologically distinct portions of the individual in the sample includes a probability distribution function corresponding to features of the biometrics obtained from enrolling the individual;

the information corresponding to two physiologically distinct portions of the person in the specimen includes a value that may be compared to the probability distribution function; and in comparing the specimen to the sample, the probability distribution function of the sample is compared to the value of the specimen, and a match is determined if the value is positioned relative to the probability distribution function so as to indicate that a match is likely.

18. The method of claim 6, wherein:

the information corresponding to two physiologically distinct portions of the individual in the sample includes a receiver operating curve corresponding to features of the biometrics obtained from enrolling the individual;

the information corresponding to two physiologically distinct portions of the person in the specimen includes a value that may be compared to the receiver operating curve; and in comparing the specimen to the sample, the receiver operating curve of the sample is compared to the value of the specimen, and a match is determined if the value is positioned relative to the receiver operating curve so as to indicate that a match is likely.

* * * * *